(12) United States Patent
Geijzendorffer et al.

(10) Patent No.: US 8,752,719 B2
(45) Date of Patent: Jun. 17, 2014

(54) BABY FEEDING BOTTLE

(75) Inventors: Carolien Willemijn Geijzendorffer, Mussel (NL); Johannes Tseard Van Der Kooi, Hurdegaryp (NL); Paulus Cornelis Duineveld, Drachten (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/147,211

(22) PCT Filed: Feb. 11, 2010

(86) PCT No.: PCT/US2010/023837
§ 371 (c)(1),
(2), (4) Date: Oct. 11, 2011

(87) PCT Pub. No.: WO2010/093755
PCT Pub. Date: Aug. 19, 2010

(65) Prior Publication Data
US 2012/0018398 A1 Jan. 26, 2012

(30) Foreign Application Priority Data
Feb. 10, 2009 (EP) .................................. 09152464

(51) Int. Cl.
*A61J 9/02* (2006.01)
*A61J 11/00* (2006.01)

(52) U.S. Cl.
USPC ......... 215/11.2; 215/11.1; 215/11.4; 374/150

(58) Field of Classification Search
USPC ................. 215/11.1–11.6; 374/150
See application file for complete search history.

(56) References Cited

U.S. PATENT DOCUMENTS

| 3,125,984 | A | * | 3/1964 | Okuyama | 116/217 |
| 4,878,588 | A | * | 11/1989 | Ephraim | 215/11.2 |
| 4,930,902 | A | * | 6/1990 | Yata et al. | 374/150 |
| 5,208,896 | A | | 5/1993 | Katayev | |
| 5,310,261 | A | * | 5/1994 | Blue et al. | 374/150 |
| 5,678,925 | A | * | 10/1997 | Garmaise et al. | 374/157 |
| 6,264,049 | B1 | * | 7/2001 | Shteynberg | 215/11.2 |
| 6,864,462 | B2 | * | 3/2005 | Sanoner et al. | 219/387 |
| 7,051,890 | B2 | * | 5/2006 | Onoda et al. | 215/383 |
| 2001/0046253 | A1 | | 11/2001 | Schmidt | |
| 2006/0081599 | A1 | | 4/2006 | Anderson | |
| 2007/0121702 | A1 | | 5/2007 | La Guardia et al. | |

FOREIGN PATENT DOCUMENTS

GB 1204275 9/1970

* cited by examiner

*Primary Examiner* — Fenn Mathew
*Assistant Examiner* — Jennifer Castriotta

(57) ABSTRACT

A baby feeding bottle (1) is provided that comprises a wall member (4) having an inner surface (6), a bottom part (2) and an upper part (7). Further a temperature indicator (11) is provided. The inner surface (6) of the wall member (4) defines an internal space (10). The bottle (1) further comprises a thermally conductive element (13) that is thermally connected to the temperature indicator (11) and extends from the bottom part (2) to the upper part (7) of the wall member (4) along at least part of the inner surface (6) thereof. The thermally conductive element (13) has a surface area that is significantly smaller than the surface area of the inner surface (6) of the wall member (4).

17 Claims, 3 Drawing Sheets

BABY FEEDING BOTTLE

FIELD OF THE INVENTION

The present invention relates to a baby feeding bottle, in particular to a baby feeding bottle having improved temperature indicative properties.

BACKGROUND OF THE INVENTION

Based upon the fact that the temperature of mother's milk is approximately 37° C., it has been recognized that milk/formula given to an infant or baby should be at approximately this temperature. Liquid above or below this temperature may be rejected by the baby. If the liquid is accepted and is too hot, the baby's lips and mouth may be burned. If the liquid is too cold, it may bring a case of indigestion.

In the past, the most common method for determining the temperature of the fed to a baby was simply the tactile feeling of the fingertip, the hand palm or inner side of the wrist of a person having access to the baby feeding bottle. The determination was therefore often unreliable as it simply depended upon the thermal feeling of a particular person and furthermore was not free from the influences of atmospheric or room temperature.

It is known to use temperature indicators that can display the temperature of the bottle contents. These may have the form of digital devices which are not integrated with the bottle, because they cannot withstand common bottle use like heating, cleaning and sterilizing. Quantitative temperature indicators that are not digital are for example glass bulb thermometers or thermochromatic strips with a temperature range.

Other feeding bottles are provided with qualitative temperature indicators that indicate when the contents of the bottle are too hot, too cold or when the contents are 'OK'. These baby feeding bottles are unsatisfactory, as the caregiver wants to know the temperature of the contents. Caregivers want to know the temperature of the feed, so that they can decide if it is safe to feed their babies. Caregivers may define their own personal temperature range for feeding the baby. Some caregivers will find that the feed should be between 30 and 37° C., while others prefer a range of 35 to 37° C. These values may vary depending on the age of the baby. Newborns tend to be more sensitive to the temperature of their feed than older babies.

A problem with the generally known feeding bottles that are provided with temperature indicators is that, either they provide the user with wrong information concerning the actual temperature of the contents of the bottle, i.e. a too low temperature indication, or that it takes a long time for the temperature indicator to give the correct temperature. Both problems are associated with the thermal properties of the material of the wall of the feeding bottle. On the one hand there exists a temperature difference across the wall. On the other hand it takes an unacceptable long time for the wall to reach the same temperature as the contents of the bottle, or at least a temperature that is close to that temperature.

In United States patent document US 2007/0121702 a solution for the above general problem is proposed. US 2007/0121702 discloses a drinking cup for holding hot liquids. The cup has a wall member and a bottom member that together form an internal space in which the hot liquid can be held. The wall member is made from an insulating material and embedded in said wall member a thermometer is provided. The thermometer is visible from outside the cup. US 2007/0121702 further discloses in a first embodiment that the complete inner surface of the internal space is provided with a thermally conducting part that conducts heat better than the wall member material. The thermometer is in direct contact with the thermally conducting layer, which in turn is in direct contact with the liquid in the internal space.

In a second embodiment only a backside of the thermometer that is directed towards the internal space is covered with said thermally conductive material, whereby the thermometer is located in the lower part of the drinking cup.

By providing a thermally conductive material that is in direct contact with on the one hand the hot liquid and on the other hand with the thermometer, an improved heat transfer to the thermometer is achieved resulting in an improved and faster temperature reading.

It is a concern of the solutions proposed in US 2007/0121702 that these solutions are not suitable for a baby feeding bottle. A baby feeding bottle is used in mainly two positions. A first position in which the baby feeding bottle is being filled with milk and a second position in which the milk is fed to the baby and in which the baby feeding bottle is substantially turned upside down with respect to the first position. In the first position the milk or liquid in the bottle is located in the lower part of the feeding bottle. In the second position the milk or liquid is located in the upper part of the feeding bottle.

The second embodiment of US 2007/0121702 cannot be used with a baby feeding bottle as the thermally conductive material is not in contact with the contents of the drinking cup in the second position. Hence, this solution cannot provide an improved temperature read-out in the second position of the feeding bottle.

The first embodiment of US 2007/0121702 would in principle be able to provide an improved temperature read-out in both positions of the feeding bottle, however according to US 2007/0121702 this requires the complete inner surface of the internal space to be covered with the thermally conductive material. This raises the concern that the feeding bottle cannot be used together with a microwave oven, which is commonly used to heat the contents of the feeding bottle, and thus compromises the usability of the feeding bottle.

OBJECT OF THE INVENTION

The present invention aims to provide a baby feeding bottle with improved temperature indicative properties in any position of the baby feeding bottle and which does not compromise on the usability of the feeding bottle.

SUMMARY OF THE INVENTION

The inventors have realized that the concerns of the known solutions can be solved, and a baby feeding bottle can be provided with improved temperature indicative properties without compromising on usability, by providing a baby feeding bottle which comprises a wall member having an inner surface, a bottom part and an upper part. Further a temperature indicator is provided. The inner surface of the wall member defines an internal space. The bottle further comprises a thermally conductive element that is thermally connected to the temperature indicator and extends from the bottom part to the upper part of said wall member along at least part thereof. The thermally conductive element has a surface area that is significantly smaller than a surface area of the inner surface of the wall member.

As the thermally conductive element extends from the bottom part to the upper part of the bottle along at least part of the inner surface of the wall member, the baby feeding bottle can be used in at least said two positions as the thermally conductive element is able to contact the contents of the feeding bottle in any of said positions of the feeding bottle. Furthermore, by providing that the surface area of the thermally conductive element is significantly smaller than the surface area of the inner surface of the wall member the feeding bottle can be used with a microwave oven.

In an embodiment the thermally conductive element extends from the bottom part to the upper part in longitudinal direction of the bottle. This means that the thermally conductive element substantially extends in a straight line between the bottom part and the upper part, which solution requires a minimum amount of thermally conductive material for the thermally conductive element and yields good manufacturability.

In an embodiment the thermally conductive element extends from the bottom part to the upper part in a spiraling manner, such that the thermally conductive element covers a large part of the inner surface of the wall member, i.e. the feeding bottle. Furthermore, this also makes the feeding bottle insensitive to any rotational movement and/or displacement along the longitudinal axis of the feeding bottle, i.e. the thermally conductive element will be in contact with the contents of the feeding bottle irrespective of its orientation in any direction. This further increases the conduction of heat to the temperature indicator.

In an embodiment the thermally conductive element is a thermally conductive wire. This yields a very reduced surface area of the thermally conductive element.

In an embodiment the thermally conductive element comprises a first thermally conductive section that is disposed along the perimeter of the internal space near the bottom part and/or comprises a second thermally conductive section that is disposed along the perimeter of the internal space near the upper part. This increases the contact area of the thermally conductive element at those locations in the internal space of the feeding bottle which are likely to contain the contents of the feeding bottle in any of said feeding positions thereof, further increasing the conduction of heat to the temperature indicator.

In an embodiment the thermally conductive element is embedded in the wall member, so that only the material of the wall member can get into contact with the thermally conductive elements which improves hygiene and improves cleanability.

In an embodiment the wall member has a thickness at those parts where said thermally conductive elements is embedded therein towards the internal space of no more than 0.7 mm, in particular no more than 0.5 mm and more in particular no more than 0.4 mm. It has proven that the thermal response temperature indicator is sufficiently fast and accurate for the purposes of baby feeding bottles when a wall thickness is used that is no larger than said thicknesses.

In an embodiment the temperature indicator comprises a thermochromatic material chosen from a group comprising liquid crystal and leuco dyes. Such thermometers have proven to be very convenient for use with a baby feeding bottle.

In an embodiment the first thermally conductive section is disposed on, at least partly, an inner surface of the bottom part. This is a suitable location for the thermally conductive material to be placed in a feeding bottle.

In an embodiment the temperature indicator comprises a layer of thermally conductive material, which layer is in contact with said thermally conductive element. This improves the working of the temperature indicator.

In an embodiment the temperature indicator comprises a plurality of protrusions which extend into the wall member, so that heat from the contents of the bottle can be more easily transported to the temperature indicator.

In an embodiment the protrusions comprise a layer of thermally conductive material, so as to further improve the working of the temperature indicator.

In an embodiment the wall member is, at least partly, made of a transparent material, such that a user or caregiver using the bottle can see the contents of the feeding bottle.

BRIEF DESCRIPTION OF THE DRAWINGS

Further advantageous embodiments of the baby feeding bottle according to the invention are described in the claims and in the following description with reference to the drawing, in which:

DETAILED DESCRIPTION OF EXAMPLES

Figure 1:
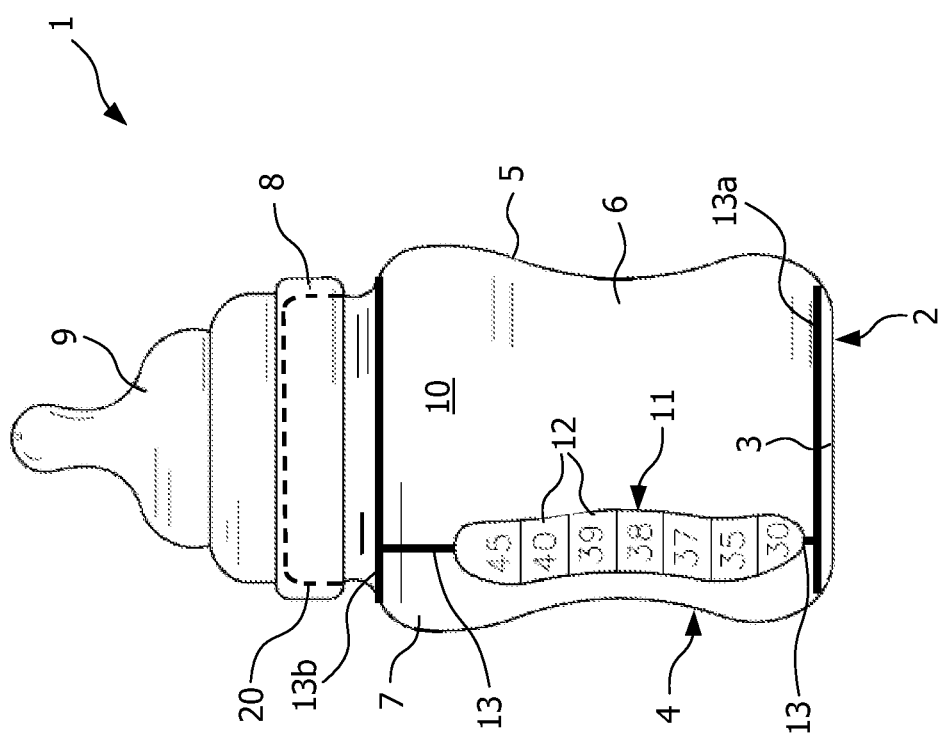
FIG. 1 depicts a baby feeding bottle of the invention.

A baby feeding bottle 1 according to the present invention is shown in a first embodiment in FIG. 1. The feeding bottle 1 comprises a wall member 4 having a generally indicated bottom part 2 and a generally indicated upper part 7. The wall member 4 has an inner surface 6. The upper part 7 can be provided with a threaded part. The upper part 7 comprises an access opening (20) to attach a cap 8 with a feeding nipple 9. The inner surface 6 of the wall member 4 defines an internal space 10. The internal space 10 is arranged to receive and/or hold a liquid, in particular baby milk.

Preferably, and as shown in FIG. 1, the wall member 4 and its bottom part 2 are integral and form a single part. However, it is also possible that the bottle 1 comprises a separate bottom part which is formed by a separate part and which can be detachably coupled to the wall member 4, for example by means of a threading, so as to form a continuous wall member. This is not further shown, but it will be apparent for a person skilled in the art how to achieve this. The material of the wall member 4 and/or the detachable bottom part 2 if present, is for example PC, PP or PES, which is preferably transparent.

As indicated, preferably, the wall member 4 is made from a transparent material that allows a user to see the contents of the bottle 1. This is in particularly useful when instant baby milk is made using the bottle, by introducing dry baby milk powder through the access opening (20) and adding hot water thereto. Shaking of the bottle 1 will mix and prepare the baby milk. Visibly inspecting the contents of the bottle 1 will tell a caregiver if the milk has been properly mixed and is without lumps.

Further, the baby feeding bottle 1 is provided with a temperature indicator 11. The temperature indicator 11 has several temperature indications 12. In the example of FIG. 1, the temperature indicator 11 is a substantially flat strip, for example a liquid crystal strip thermometer or a strip comprising thermo chromatic material and/or leuco dyes. However, other types are also conceivable. The temperature indicator or thermometer 11 has a non-linear temperature scale. This is particularly useful for a baby feeding bottle, as in this way it is possible to provide more useful information in less space in comparison with a scale that is linear. In the example of FIG. 1 the accuracy of the temperature indicator 11 around a target temperature 37° is higher than around temperatures that are either too high or too low, i.e. the milk is too hot or too cold to feed to a baby. However, the present invention is not limited to a non-linear scale. The thermometer 11 preferably covers most of the height of the baby feeding bottle 1 to improve readability thereof. This means however that the thermometer 11 may extend beyond the level of the liquid inside the bottle 1.

Inside the baby bottle 1, i.e. in the internal space 10, a thermally conductive element 13 is provided. It is noted here that with the term 'thermally conductive' is meant to include any material that easily transmits heat. In particular it is meant by the term 'thermally conductive' that said material transmits heat better than the material the wall member 2 and/or the bottom member 2 are made from, these being for example made from polycarbonate (PP, PES). Materials that fulfill such requirements comprise for example metals, such as copper. Other materials are also conceivable for the fabrication of the thermally conductive element, such as carbon. The thermally conductive element 13 in the example of FIG. 1 is for example a wire, a strip or the like, that is disposed along an inner perimeter of the inner surface 6 of the wall member 4. In the example that the thermally conductive element 13 is in the form of a wire, its diameter would preferable be less than 1.0 mm, more preferably less than 0.5 mm and most preferably less than 0.2 mm. The thermally conductive element 13 may be glued to the inner surface 6, for example in a recess that is present in said inner surface 6. However, it is also possible that said thermally conductive element 13 is, at least partly, embedded in the material of the wall member 4. In that case it is preferred that the thickness of the wall member between the thermally conductive element 13 and the internal space 10, is not more than about 0.7 mm, preferably not more than 0.5 mm and most preferably no more than 0.4 mm. Any wall thickness more than these indicated thicknesses may have a detrimental effect on the transfer of heat from the contents of the bottle 1 and the thermally conductive element 13. In case the thermometer 11 is embedded in the wall member 4, care should be taken that the thermal expansion coefficient of the material of the wall member 4 and the conductive elements 13 is about equal for both materials to avoid tension and possible damage caused by said tension. It is noted here that the thermometer 11 and/or the thermally conductive element 13 may be embedded in the wall member 4 such that they are in contact with the contents of the bottle or are separated from the contents by a wall thickness of the indicated amounts.

It can further be seen in FIG. 1 that the thermally conductive element 13, substantially, extends from the bottom part 2 to the upper part 7 along at least part of the inner surface 6 of the wall member 4. Furthermore it can be seen that the thermally conductive element 13 has a surface area that is significantly smaller than the surface area of the inner surface 6 of the wall member 4. The ratio between the surface area of the internal space 10 is for example less than one quarter, preferable less than one tenth and more preferably less than one hundredth. In combination with a transparent material for the wall member 4 this allows for a good visibility of the contents of the feeding bottle 1, in other words the thermally conductive element 13 does not impair visibility. On the other hand, by making the surface area of the thermally conductive element 13 as small as possible the feeding bottle 1 can safely be placed in a microwave oven in order to heat the contents of the feeding bottle 1. Further it should also be taken into consideration that with providing the thermally conductive element 13 on the inner surface 6 it should be avoided to make a closed loop so the geometry of the thermally conductive element 13 is safe for microwave heating. Preferably, the thickness of the wire-shaped thermally conductive element 13 is so small that it is hardly visible to the human eye.

The thermally conductive element 13 is thermally connected to the thermometer 11 so that the heat transferred from the contents of the bottle 1 to the thermally conductive element 13 is can be quickly and efficiently transferred to the thermometer 11. It is noted that it may also be possible to design the conductive element 13 and the thermometer 11 so as that these share conductive material.

To ensure an acceptable response time of the thermometer 11 the conductive material has a thermal diffusion coefficient that is at least larger than $5 \cdot 10^{-6}$ m$^2$/s, more in particular larger than $3 \cdot 10^{-5}$ m$^2$/s, and preferably more than $1 \cdot 10^{-4}$ m$^2$/s.

As can be seen in FIG. 1, the thermally conductive element 13 comprises a first thermally conductive section 13a that is disposed along the perimeter of the internal space 10 near the bottom part 2 of the wall member 4 and comprises a second thermally conductive section 13b that is disposed along the perimeter of the internal space 10 near the upper part 7 of the wall member 4. The first 13a and second 13b sections are distanced from each other. This allows the baby feeding bottle 1 to be used in two main positions thereof: a first position in which the baby feeding bottle 1 is being filled with milk and a second position in which the milk is fed to the baby and in which the baby feeding bottle is substantially turned upside down with respect to the first position. In the first position the milk or liquid in the bottle is located in the bottom part 2. In the second position the milk or liquid is located in the upper part 7. Hence, independent of the position of the bottle 1, always one of said parts of the thermally conductive element 13 will be in contact with the contents of the bottle 1.

It is noted that the invention also works in case the thermally conductive element 13 is not provided with the first and second sections 13a, 13b. As long as the thermally conductive element 13 extends between the upper part 7 and bottom part 2, the thermally conductive element 13 will be able to stay in contact with the contents of the feeding bottle in either the position in which the bottle 1 is filled or in the position in which the bottle 1 is used for feeding.

In the embodiment of FIG. 1, the thermally conductive element 13 may also be designed such as to cover, at least partly, an inner surface 3 of the bottom part 2, so that a relatively large surface can be provided that is capable of transferring heat to the thermometer 11. For this purpose the thermally conductive element 13, in particular its second section 13b thereof, may be designed as an element that covers the inner surface 3 of the bottom part 2, or bottom (lower) section of the bottle 1. However, it may also take the shape of a wire-like conductive element.

Figure 3:
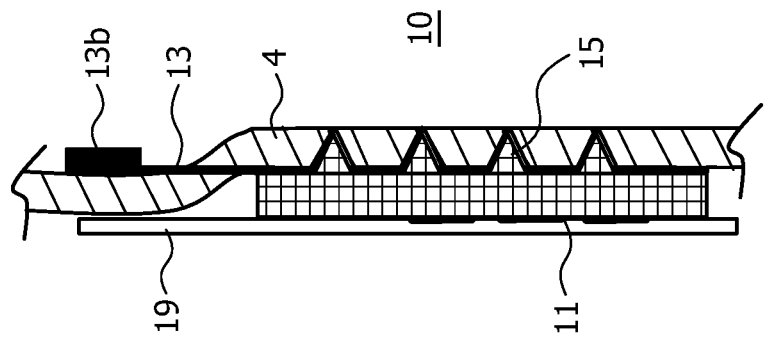
FIG. 3 depicts a detail of the bottle of FIG. 1 with the temperature indicator of FIG. 2.
Figure 2:
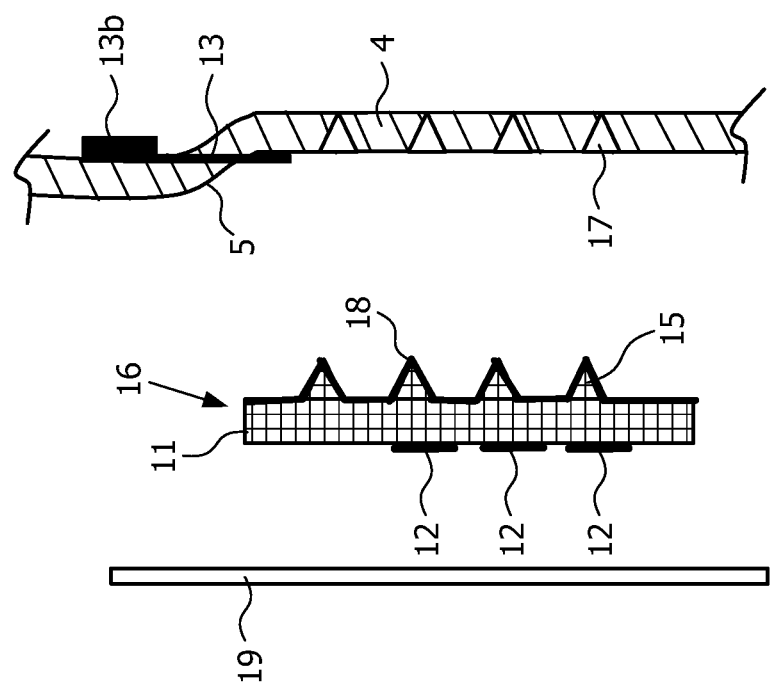
FIG. 2 is an exploded view of an embodiment of a temperature indicator for use with the invention.

FIG. 2 and FIG. 3 show an embodiment of a thermometer or temperature indicator 11 as can be used with a baby feeding bottle 1 according to the invention. FIG. 2 is an exploded view of the assembled situation of FIG. 3 and is provided to improve illustrative clarity.

As can been seen in FIG. 3 with reference to FIG. 2, the thermometer 11 is attached to the outer surface 5 of the only partly shown wall member 4, in particular the thermometer 11 is located in a recess provided in the wall member 4. It is also possible that the thermometer 11 is, at least partly, embedded in the wall member 4. This is not further shown in the drawing. The thermometer 11 is provided with a plurality of protrusions 15 that extend from a backside surface 16 of the thermometer 11. The protrusions 15 are shown in the example of FIGS. 2 and 3 as being substantially triangular in cross-section, but it is to be understood that other cross-sections are also conceivable, such as rectangular or tubular.

The protrusions 15 extend into cut-outs 17 in the wall member 4, which are shaped such that the protrusions 15 are in close contact with the material of the wall member 4. The cut-outs 17 may be open towards the internal space 10 of the baby feeding bottle, such that the protrusions 15 can be brought into contact with the contents of the bottle. Further the backside 16 of the thermometer 11 is provided with a layer 18 of thermally conductive material, which layer 18 is in thermal contact with the thermally conductive element 13. In FIGS. 2 and 3 this has schematically been indicated for the upper area of the feeding bottle and also shows the second thermally conductive section 13b. As the thermometer 11 is preferably a liquid crystal strip thermometer or a strip comprising thermo chromatic material such as leuco dyes as was explained above, it is convenient to protect the surface of the thermometer 11 that carries the temperature indications 12, of which only three are shown, by means of a protective cover 19, which is made of a wear-resistant and transparent material. In the example of FIGS. 2 and 3, the protective cover 19 is of such a size and shape that the recess in the wall member 4, in which the thermometer 11 is located, is fully covered.

A further embodiment of the feeding bottle 1 is presented with reference to FIG. 4, which is the same as the feeding bottle 1 as shown in FIG. 1 except for the following differences as described herein below.

Figure 4:
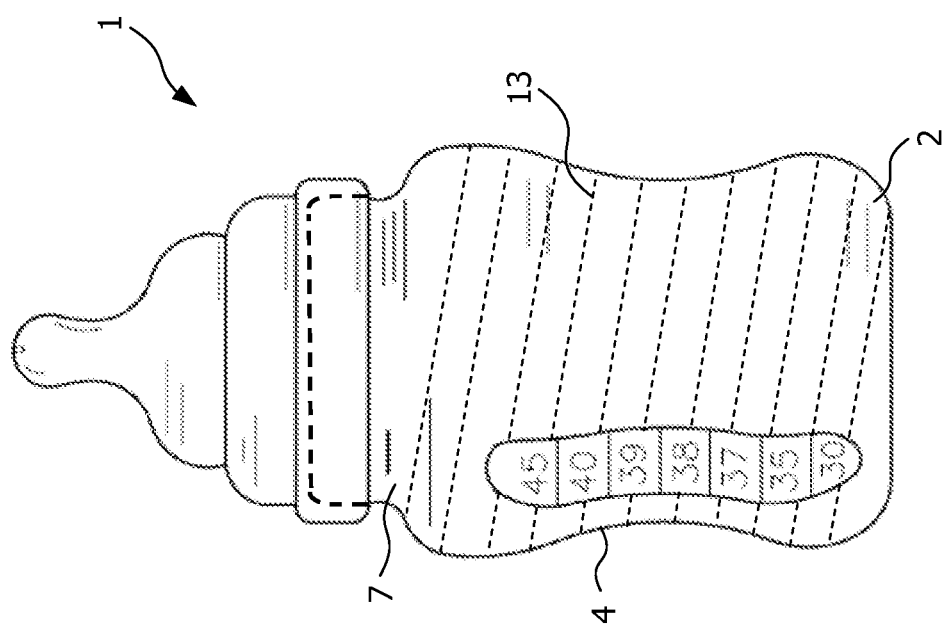
FIG. 4 depicts an alternative embodiment of the bottle of FIG. 1.

The baby feeding bottle 1 of FIG. 4 comprises a thermally conductive element 13 which extends from the bottom part 2 to the upper part 7 of the wall member 4 in a spiraling, or thread-like manner. This embodiment ensures that the thermally conductive element 13 will be in contact with the contents of the bottle 1 in any possible position thereof. Furthermore, the amount of thermally conductive material that is in contact with the contents of the bottle 1 is in this manner increased in comparison with the embodiment of FIG. 1. However, as the thermally conductive element 13 may be made from a thin wire or wire-like material, the surface area thereof is still significantly smaller than the surface area of the wall member 4 it is attached to. Hence, the bottle 1 is still usable with a microwave oven and visibility on the contents is still guaranteed.

It is noted that the pitch and/or the mutual distance between the respective threads of the thermally conductive element 13 may of course be varied. Furthermore, it is also conceivable to use different patterns or meshes for the thermally conductive element 13, such as a number of parallel wires and/or a rectangular mesh.

It is noted that it will be apparent to a person skilled in the art that the thermally conductive element 13 can be attached to the wall member 4 is several different ways. In one such way the material of the bottle 1, i.e. the material that makes up the wall member 4, can be moulded onto the conductive element, that is introduced in a mould prior to the moulding process. Another way would be to push the thermally conductive element against or into the wall member during a blow moulding process before the material of the bottle is returned to a hardened or solid state. Further, also gluing or a printing process is conceivable.

It is also possible to apply a conductive layer to the conductive element, such as a thin coating. Such a coating may be a transparent sheet.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The invention claimed is:

1. A baby feeding bottle, comprising: a wall member having an inner surface, a bottom part and an upper part, and a temperature indicator, wherein the inner surface of the wall member defines an internal space, said bottle further comprising: a thermally conductive element that is both thermally and physically connected to the temperature indicator and linearly extends from the bottom part to the upper part of said wall member in a longitudinal direction of the bottle along at least part of the inner surface thereof, and wherein the thermally conductive element has a surface area that is significantly smaller than a surface area of the inner surface of the wall member, and wherein the thermally conductive element is configured for receiving heat from the contents of the baby feeding bottle; and wherein the thermally conductive element extends from the bottom part to the upper part in a spiraling manner.

2. The baby feeding bottle according to claim 1, wherein the thermally conductive element is a thermally conductive wire.

3. The baby feeding bottle according to claim 1, wherein the thermally conductive element is, at least partly, embedded in the wall member.

4. The baby feeding bottle according to claim 3, wherein the wall member has a thickness at those parts where said thermally conductive element is embedded therein towards the internal space of no more than 0.7 mm.

5. The baby feeding bottle according to claim 3, wherein the temperature indicator comprises a thermochromatic material chosen from a group comprising liquid crystal and leuco dyes.

6. The baby feeding bottle according to claim 3, wherein the wall member has a thickness at those parts where said thermally conductive element is embedded therein towards the internal space of no more than 0.5 mm.

7. The baby feeding bottle according to claim 3, wherein the wall member has a thickness at those parts where said thermally conductive element is embedded therein towards the internal space of no more than 0.4 mm.

8. A baby feeding bottle, comprising: a wall member having an inner surface, a bottom part and an upper part, and a temperature indicator, wherein the inner surface of the wall member defines an internal space, said bottle further comprising: a thermally conductive element that is both thermally and physically connected to the temperature indicator and linearly extends from the bottom part to the upper part of said wall member in a longitudinal direction of the bottle along at least part of the inner surface thereof, and wherein the thermally conductive element has a surface area that is significantly smaller than a surface area of the inner surface of the wall member, and wherein the thermally conductive element is configured for receiving heat from the contents of the baby feeding bottle; wherein the thermally conductive element comprises a first thermally conductive section that is disposed along the perimeter of the internal space near the bottom part and comprises a second thermally conductive section that is disposed along the perimeter of the internal space near the upper part.

9. The baby feeding bottle according to claim 8, wherein the thermally conductive element is a thermally conductive wire.

10. The baby feeding bottle according to claim 8, wherein first thermally conductive section is disposed on, at least partly, an inner surface of the bottom part.

11. The baby feeding bottle according to claim 8, wherein the temperature indicator comprises a layer of thermally conductive material, which layer is in contact with the thermally conductive element.

12. The baby feeding bottle according to claim 8, wherein the temperature indicator comprises a plurality of protrusions which extend into the wall member.

13. The baby feeding bottle according to claim 12, wherein said protrusions comprise a layer of thermally conductive material.

14. The baby feeding bottle according to claim 8, wherein the wall member is, at least partly, made of a transparent material.

15. A baby feeding bottle, comprising: a wall member having an inner surface, a bottom part and an upper part, and a temperature indicator, wherein the inner surface of the wall member defines an internal space, said bottle further comprising: a thermally conductive element that is both thermally and physically connected to the temperature indicator and linearly extends from the bottom part to the upper part of said wall member in a longitudinal direction of the bottle along at least part of the inner surface thereof, wherein the thermally conductive element comprises a first thermally conductive section that is disposed along the perimeter of the internal space near the bottom part and comprises a second thermally conductive section that is disposed along the perimeter of the internal space near the upper part, wherein first thermally conductive section is disposed on, at least partly, an inner surface of the bottom part, wherein the thermally conductive element has a surface area that is significantly smaller than a surface area of the inner surface of the wall member, and wherein the thermally conductive element is configured for receiving heat from the contents of the baby feeding bottle.

16. A baby feeding bottle, comprising: a wall member having an inner surface, a bottom part, and an upper part, and a temperature indicator, wherein the inner surface of the wall member defines an internal space, said bottle further comprising: a thermally conductive element that is both thermally and physically connected to the temperature indicator and linearly extends from the bottom part to the upper part of said wall member in a longitudinal direction of the bottle along at least part of the inner surface thereof, wherein the thermally conductive element comprises a first thermally conductive section that is disposed along the perimeter of the internal space near the bottom part and comprises a second thermally conductive section that is disposed along the perimeter of the internal space near the upper part, wherein the temperature indicator comprises a layer of thermally conductive material, which layer is in contact with the thermally conductive element, wherein the thermally conductive element has a surface area that is significantly smaller than a surface area of the inner surface of the wall member, and wherein the thermally conductive element is configured for receiving heat from the contents of the baby feeding bottle.

17. A baby feeding bottle, comprising: a wall member having an inner surface, a bottom part and an upper part, and a temperature indicator, wherein the inner surface of the wall member defines an internal space, said bottle further comprising: a thermally conductive element that is both thermally and physically connected to the temperature indicator and linearly extends from the bottom part to the upper part of said wall member in a longitudinal direction of the bottle along at least part or the inner surface thereof, wherein the thermally conductive element comprises a first thermally conductive section that is disposed along the perimeter of the internal space near the bottom part and comprises a second thermally conductive section that is disposed along the perimeter of the internal space near the upper part, wherein the temperature indicator is provided with a plurality of protrusions that extend from a backside surface of the temperature indicator, wherein the plurality of protrusions extend into complementary recesses of the wall member such that the protrusions can be brought into contact with the thermally conductive element, which is brought in to contact with the contents of the baby feeding bottle, wherein the thermally conductive element has a surface area that is significantly smaller than a surface area of the inner surface of the wall member, and wherein the thermally conductive element is configured for receiving heat from the contents of the baby feeding bottle.

* * * * *